Figure 4:
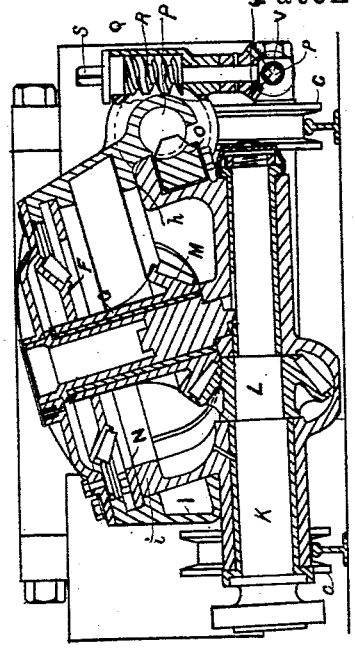

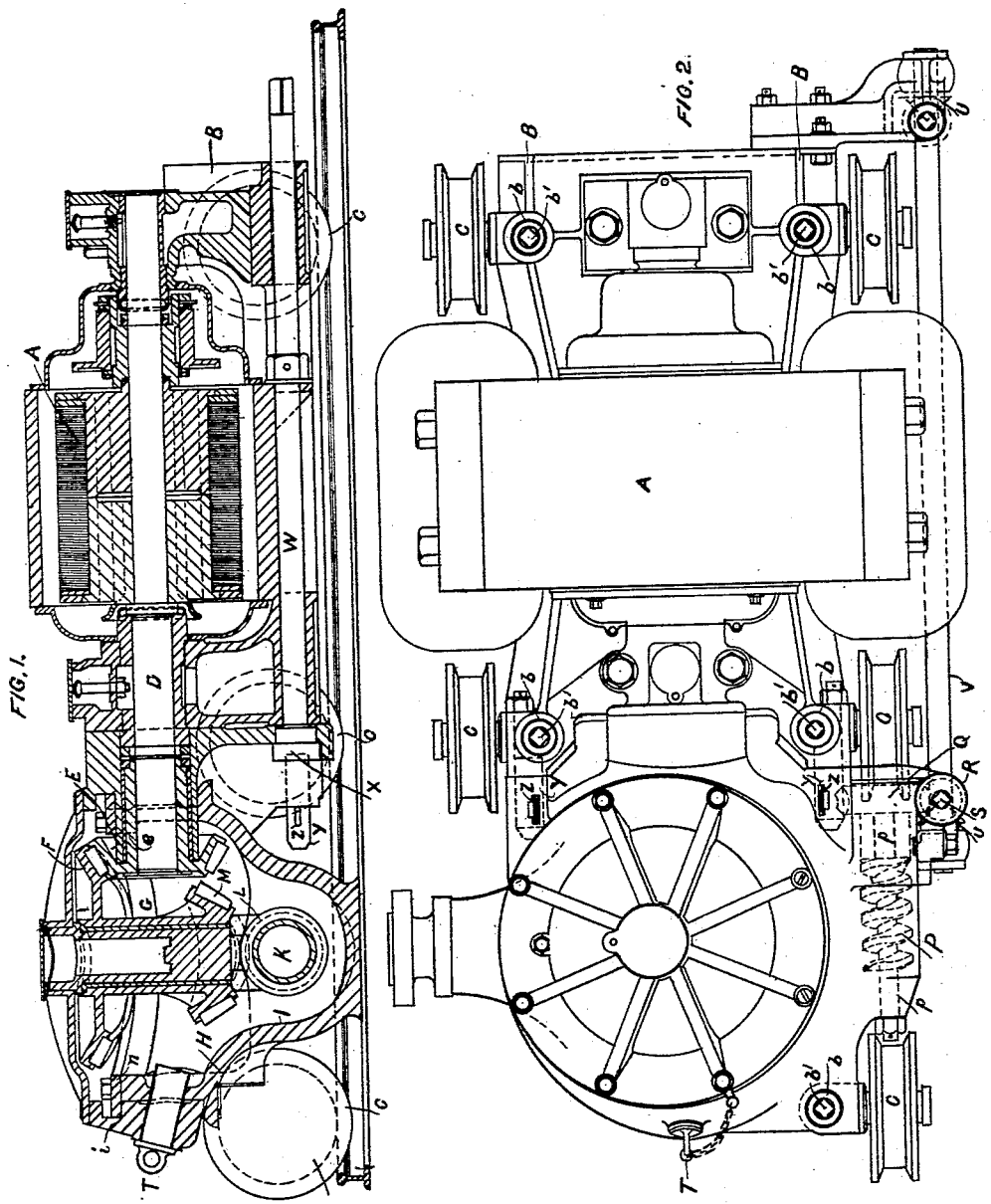

(No Model.)  3 Sheets—Sheet 2.

C. W. & L. B. ATKINSON.
MACHINERY FOR CUTTING COAL AND OTHER MINERALS.

No. 476,594. Patented June 7, 1892.

Witnesses:

Inventors:
Claude William Atkinson
Llewelyn Birchall Atkinson

By Richards
their Attorneys.

(No Model.) 3 Sheets—Sheet 3.

C. W. & L. B. ATKINSON.
MACHINERY FOR CUTTING COAL AND OTHER MINERALS.

No. 476,594. Patented June 7, 1892.

Witnesses:
E. Sawyer.
C. Pollak.

Inventors:
Claude William Atkinson
Lewellyn Birchall Atkinson
By
their Attorneys.

UNITED STATES PATENT OFFICE.

CLAUDE W. ATKINSON AND LLEWELYN B. ATKINSON, OF LONDON, ENGLAND.

MACHINERY FOR CUTTING COAL OR OTHER MINERALS.

SPECIFICATION forming part of Letters Patent No. 476,594, dated June 7, 1892.

Application filed September 16, 1891. Serial No. 405,906. (No model.)

*To all whom it may concern:*

Be it known that we, CLAUDE WILLIAM ATKINSON and LLEWELYN BIRCHALL ATKINSON, residing at London, England, have invented Improvements in Machinery for Cutting Coal or other Minerals, of which the following is a specification.

This invention relates to improvements in machinery for cutting coal or other minerals; and it consists in the relative arrangement of the electrical motor, the driving shaft and gear, and the cutting mechanism, which is mounted on a swiveling table and adapted to be turned in and out from the face of the coal, also in certain cases the oblique disposition of the cutting-bar swivel table to permit of its being brought down to or below the level of the bearing-rails. Special provision is also made in the arrangement and construction of the main frame and other parts of the machine so as to permit of the ready attachment and detachment of the motor to or from the cutting-machines of any special form to suit varying conditions, such as height of cut and right or left hand rotation in conjunction with any particular direction of traverse. Besides the above important characteristics that are embodied in our invention, as above described, we have paid special regard to the arrangements of parts, whereby the machine is made of such a form as to be easily worked in the ordinary headings or mines so as to occupy a minimum of space with large output and efficiency, special regard being had to the covering in of the working parts, gear, &c., so that the same is not clogged or interfered with by dirt, coal, or other material that might be detrimental to the working of the same. In fact, great attention has been paid to details to make the machine thoroughly practical, economical, and efficient in every respect. The machine is equally applicable for cutting close up under the roof-timbers as it is to cut close to the floor, only requiring to be inverted and mounted on a higher frame.

In order that our invention may be the better understood, we will now describe it as a machine for cutting close to the floor as an example of one way of carrying out our invention in relation to the drawings hereunto annexed, reference being had to the letters marked thereon, like letters referring to like parts in the various figures.

Figure 3:
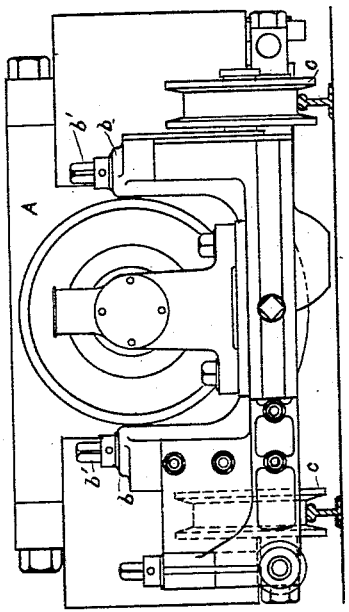
Figure 5:
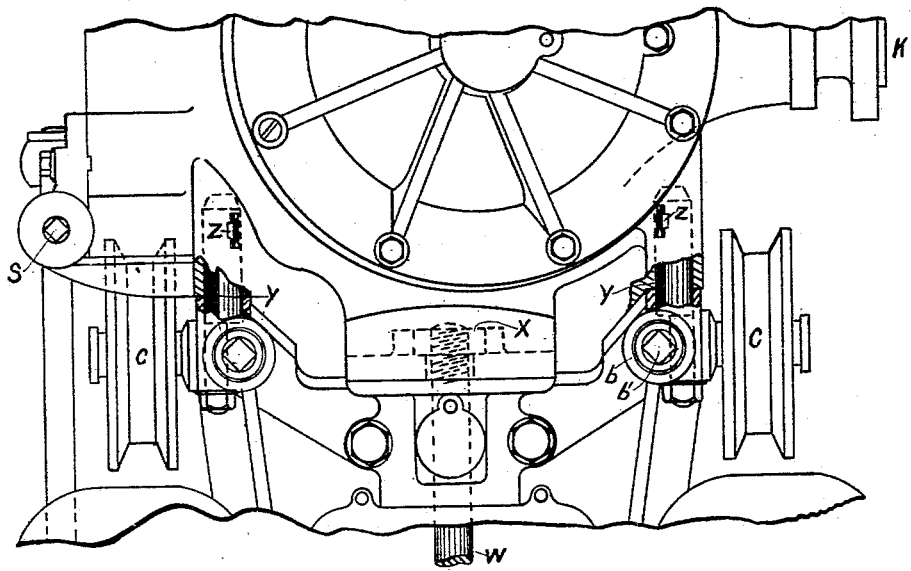
Figure 6:
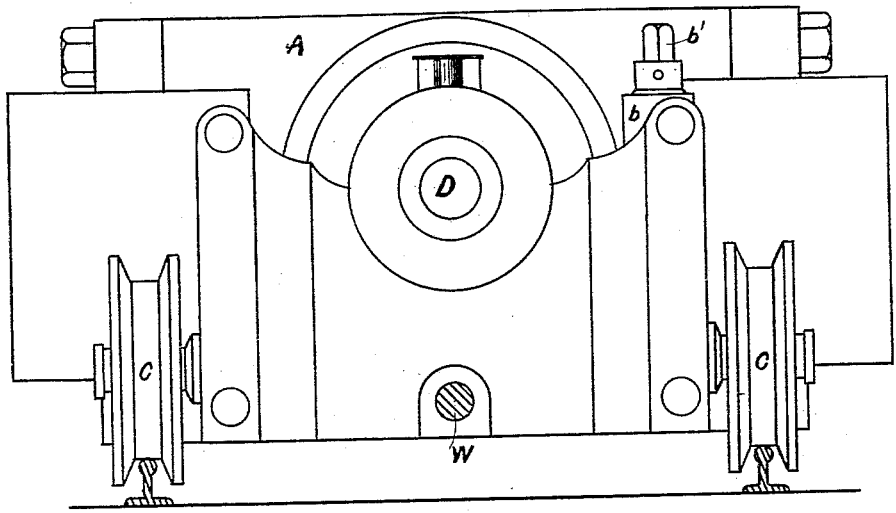

Figure 1 is a sectional side elevation of our machine. Fig. 2 is a plan. Fig. 3 is an end view looking at the motor. Fig. 4 is an end sectional elevation, the section being taken through the swivel table. Figs. 5 and 6 are sections of the frames, showing the means for uniting them on a larger scale.

To carry our invention into effect, we apply a suitable rotary electrical motor A upon a carrying-frame B, provided with wheels C, the motor A being conveniently arranged, by preference, with its shaft D in the longitudinal axis of the frame B, so as to occupy as little width as possible in a narrow heading. At the extremity of the motor-shaft D is a bevel-pinion E, gearing into a bevel-wheel F upon a shaft or sleeve G. The shaft or sleeve G is carried in a frame H, so as to revolve therein, and a flat bearing-surface $h$ is provided on the frame B, so as to form a bearing in a plane at right angles to the shaft or sleeve G to support the swiveling table I, carrying the cutter-bar axle K, which projects over the side of the carrying-frame B and has an angular rotation with the swiveling table I in any desired plane oblique or parallel to the horizontal. The cutter-bar K is driven by a bevel-wheel L, gearing with a bevel-pinion M, carried on the shaft or sleeve G. The object of this obliquity of the swiveling table I, as shown, is that the cutter-bar K, when being turned into or out from the face of the coal, is caused to travel in a plane oblique with the floor or roof, and thus avoids fouling the bearing-rails or the timbers in the roof during its motion, as in its definite cutting position at right or about at right angles to the face of the coal the cutter is below the level of the bearing-rails or above the roof-timbers and would foul the same were the turning in and out movement effected in a horizontal plane. All the driving motion is conveniently inclosed within a casing forming part of the frame H and covers to keep out grit and dust. The motor A is also protected by cases or jackets throughout, preferably according to the arrangement described in applications Serial Nos. 403,072, 403,073, and 403,024, so that no danger can arise from sparking at the commutators in inflammable atmospheres.

The swiveling frame I is maintained in its proper position against its bearing-surfaces $i$ by the ring N, which is screwed or bolted to the swiveling frame I, and thus forms its top-supporting surface. Around the swiveling frame we arrange a ring or segment of a ring O, having cogs or teeth upon its periphery, into which gears the worm P, the shaft P of which carries a worm-wheel Q, which is driven by a second worm R, operated by the spindle S, or through the bevel-gearing U and shaft V from the opposite end of the frame. The object of this gear is to effect the rotation of the swiveling frame I upon its oblique bearing-plane, so as to turn the cutter-bar into and out from the face of the coal.

A pin T is arranged to penetrate through the casing and engage with a hole in the swiveling frame I to maintain it in a fixed position when so desired.

The wheels C are each carried upon an axle mounted on a nut running in recesses upon the brackets $b$, the nut being raised and lowered in the bracket by means of screws $b'$, in order to raise or lower the machine in relation to the bearing-rails.

The frame B is divided into two parts, one part carrying the motor and the other part carrying the cutting mechanism and gear. The object of this is that the motor can be removed from one machine of specific description—such as for right-hand cutting—and be attached to another machine, say, for left-hand cutting. To effect this with ease and precision, we have made special provision for this attachment to attain the above requirement.

The wheel E is formed with a sleeve $e$, the exterior of which forms the journal on which it turns. The end of the shaft D is adapted to slide within this sleeve $e$ and drive the same by means of a key or keys in one engaging with keyways in the other.

In order to effect the drawing together of the parts with ease, we provide a shaft W, journaled in the frame B and having its end projecting from the end of the frame, so that it may be turned by means of a handle or spanner, the end being made square to effect the engagement of the latter. The opposite end of the shaft W is formed as a screw, which will engage with a nut X, carried by the portion of the frame containing the cutting mechanism. Taper pins Y, provided with slots, are arranged on each side of one part of the frame and adapted to engage with holes in the other part, so that when the two parts are brought into close proximity with one another by the screw on the shaft W, engaging with the nut X, cutters Z can be inserted into the slots of the pins Y behind shoulders on frame B, so that when driven home tight the two parts of the frame are firmly locked together.

Having now described our invention, what we claim is—

1. A machine for cutting coal or other minerals, consisting of an electric motor provided with dust and flame-light casings, inclosing armature and commutator mounted on a main frame detachably attached in two parts and carried on wheels, the motor-shaft placed parallel to the longitudinal axis of the main frame, and double bevel-gear connecting motor-shaft to a cutter-bar journaled in an arm of an oblique swiveling frame, adapted to rotate through an angle of about forty-five degrees by worm and worm-sector into a direction at right angles to the motor-shaft and in a plane oblique to the horizontal in order to allow entry of the cutter-bar into a side face of coal and ultimately to cut at a lower level than the track-rail, substantially as described.

2. In a machine for cutting coal or other minerals, the main frame divided into two parts, one part carrying the electric motor and the other part the cutting mechanism, in combination with means for detachably attaching the said two parts together, consisting of a screw-threaded shaft and taper-slotted pins with cotters on one part and a nut and hobs on the other part to engage, respectively, with each other, the gearing between the motor and cutting mechanism being adapted to engage with a sliding driving-joint to effect the driving of one by the other, substantially as and for the purposes described.

In testimony whereof we have signed our names to this specification in the presence of two subscribing witnesses.

CLAUDE W. ATKINSON.
LLEWELYN B. ATKINSON.

Witnesses:
RICHARD A. HOFFMANN,
CHARLES H. CARTER.